Nov. 15, 1949  A. METTRICK ET AL  2,487,823
JIG

Filed Nov. 28, 1945  2 Sheets-Sheet 1

INVENTORS.
ARTHUR METTRICK, &
DAVID HOOK.
BY M.O.Hayes

ATTORNEY.

Nov. 15, 1949     A. METTRICK ET AL     2,487,823

JIG

Filed Nov. 28, 1945     2 Sheets-Sheet 2

INVENTORS.
ARTHUR METTRICK, &
DAVID HOOK.

BY M. O. Hayes

ATTORNEY.

Patented Nov. 15, 1949

2,487,823

UNITED STATES PATENT OFFICE 2,487,823

JIG

Arthur Mettrick, Bellmore, and David Hook,
New York, N. Y.

Application November 28, 1945, Serial No. 631,467

1 Claim. (Cl. 77—62)

(Granted under the act of March 3, 1883, as
amended April 30, 1928; 370 O. G. 757)

This invention relates to work holding devices and it is embodied in a jig for supporting wire rope sockets or the like workpieces during a machining operation.

An object of the present invention is to provide means for expediting the drilling of ears or forks of bifurcated sockets.

Another object is to provide means for accurately drilling a plurality of socket ears simultaneously.

A further object is to provide holding means so that a plurality of socket ears can be drilled by persons having less skill than was previously required for drilling such articles.

Figure 1:
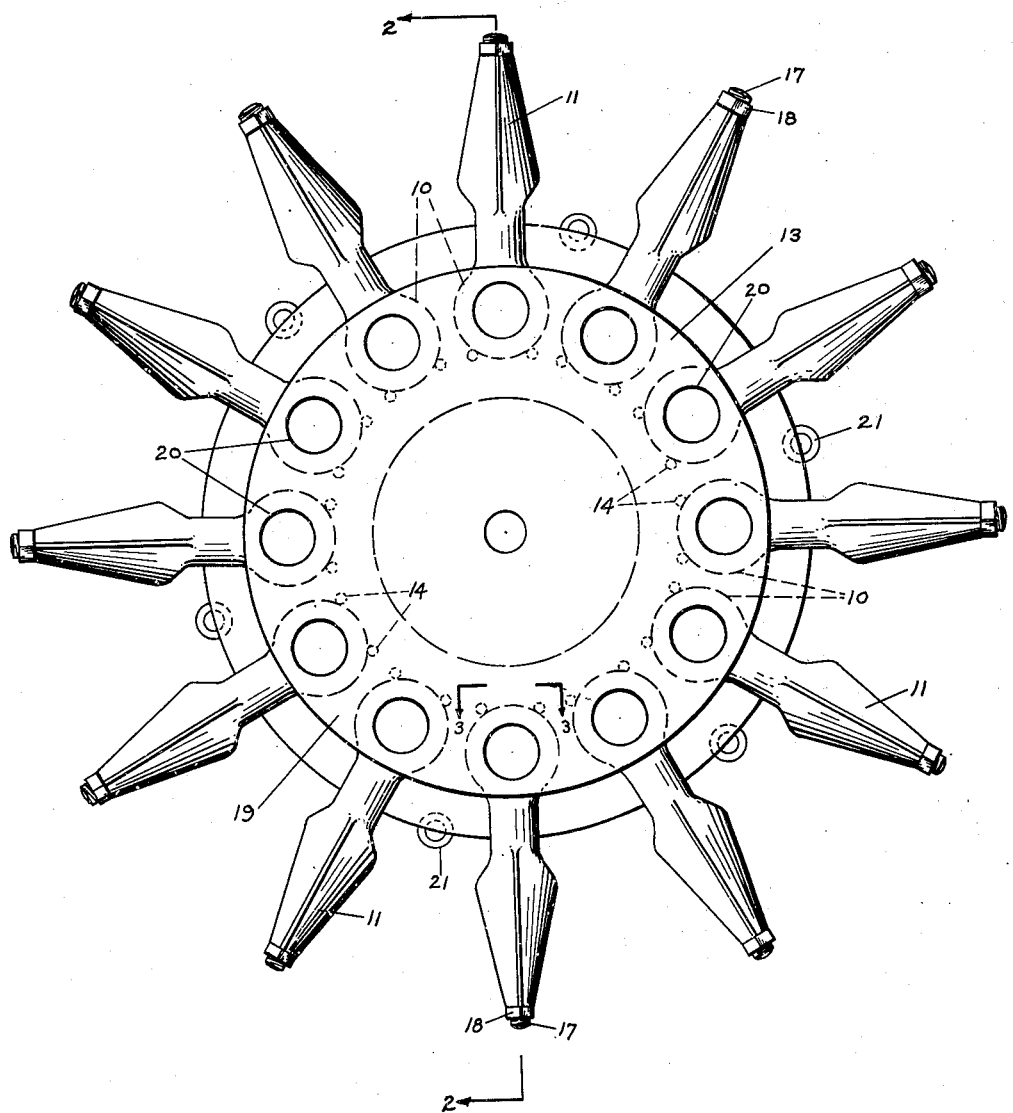
Figure 2:
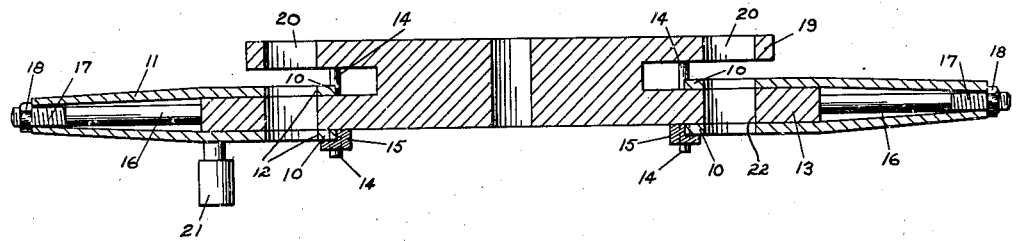
Figure 3:
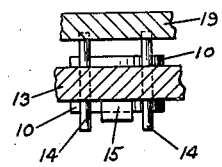
Figure 4:
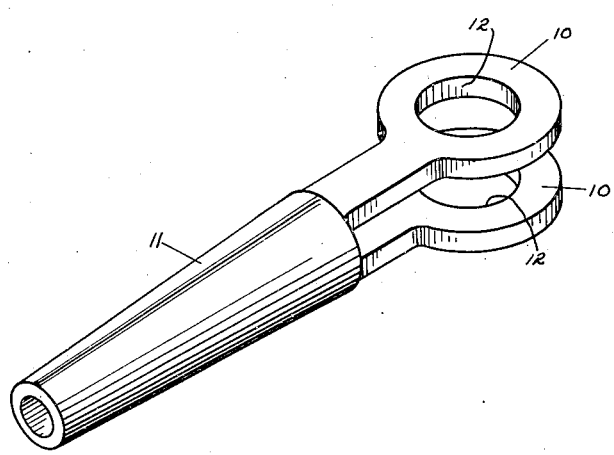

Further objects and advantages of this invention, as well as its construction, arrangement, and operation will be apparent from the following description and claim in connection with the accompanying drawings, in which, Figure 1 is a plan view of a jig embodying the invention, Figure 2 is a cross-sectional elevation, taken along the line 2—2 of Figure 1, Figure 3 is a cross-sectional elevation, taken along line 3—3 of Figure 1, and Figure 4 is a perspective of a workpiece that is adapted to be machined by the jig of the present invention.

A common shop practice for drilling holes 12 in the forks or ears 10, Figure 4, of the socket 11 is to strap the latter onto a plate, mark the center for each hole or opening 12 to be drilled, drill a pilot hole smaller than the desired hole 12, and thereafter drill the full sized hole 12, using a bit of proper size. The process is repeated for each ear 10 of a single socket 11. A jig that will enable more rapid and accurate drilling of the sockets 11 is obviously desirable.

As seen in Figure 1 the jig of the present invention comprises the base plate 13 that is preferably circular as shown. A tool-guide plate 19 is attached to the base plate 13 and positioned spaced away therefrom. The base plate 13 is adapted to be straddled by the bifurcated end of a workpiece 11, with a fork 10 thereof disposed adjacent to each of respective opposite faces. This locates one fork 10 between the plates 13 and 19 in position to rest against the adjacent surface of the plate 13.

The plate 19 is provided with the tool guide hole 20 which, under practical application of the invention, comprises a conventional drill-guiding bushing attached to plate 20 in any suitable manner. A similar hole 22 is provided in the base plate 13 disposed in coaxial alignment with the tool guide 20, and this enables a drill guided by 20 to drill the holes 12 in both forks 10 of the workpiece 11 continually.

A locating stop, comprising the pins 14, is positioned for engagement by the workpiece 11 thereby to position the forks 10 for the holes 12 to be machined. In the embodiment shown, two pins 14 project upwardly from one face of plate 13 for engagement by the peripheral edge of one fork 10, the set of pins including a similar two pins 14 project downwardly from the other face of plate 13 for engagement by the peripheral edge of the other fork 10. The additional locating lug 15 is provided on the under side of plate 13, and it presents a shoulder opposed to the adjacent face of plate 13 remote from the tool-guide plate 19. The shoulder of locating lug 15 serves as a rest for the fork 10 remote from the drill-guide bushing 20 to support the fork and prevent it from being bent under the strain of the drilling operation.

The device of the disclosed embodiment being constructed for holding a plurality of like workpieces 11 at a time for the machining operation, the tool-guide plate 9 is provided with a tool guide 20 for each workpiece 11, and these are arranged according to preferred practice in a circle as illustrated in Figure 1. A tool guide 22 is provided in the base plate 13 opposite each tool guide 20, and a set of locating pins 14 and a lug 15 is likewise provided for each workpiece to be held by the jig.

The plates 13 and 19 can be constructed as separate pieces attached together, or, as illustrated in Figure 2, the two plates 13 and 19 can be constructed integrally by being machined from a single piece. Legs 21 are preferably provided to rest the jig on a flat surface, the legs 21 being projected downwardly from the plate 13 and disposed between the workpieces 11 at spaced apart intervals peripherally of the jig. The legs 21 are long enough to support the jig above the surface, for example, of machine-tool bed plate sufficiently high for tool clearance.

The jig of the present invention comprises a longitudinal locating device that extends away from the locating pins 14, and operates to guide the workpiece 11 in its longitudinal direction. Actuating mechanism, is also provided operable to actuate the workpiece 11 towards the locating pins 14 under guidance of the longitudinal locating device, and to hold the workpiece located and in engagement with the locating pins 14. In the preferred embodiment of the invention disclosed, comprising a jig for supporting a plurality of workpieces 11 at a time, there is a longitudinal locating device and an actuating mechanism for each workpiece.

At spaced intervals about the circumference of the plate 13 are fixed studs or arms 16 that project in a direction away from the locating pins 14. The studs 16 are adapted to be projected between the forks 10 of the piece 11 and through the longitudinal perforation thereof, and are attached to the peripheral edge of the base plate 13. The studs 16 are threaded at their ends at 17, and are engaged by the nuts 18. The base plate 13 has a stud 16 projecting radially from its periphery in each radius that passes through a tool guide 22, this being the same radius that passes between the set of stop pins 14 that locates a given piece 11 for the incident tool guide 20, 22. A workpiece 11 positioned on a given stud 16, as shown in Fig. 2, is actuated longitudinally by the nut 18 in a radial direction inwardly of the plate 13, to contact the peripheral edges of the forks 10 with the stops 14, the nut 18 operating to hold the workpiece in abutting engagement with the stops. This holds the workpiece located in position for a tool, guided by the tool guides 20 and 22, to machine the ears 10 in the manner desired.

In operation, a socket 11 is slid over each arm 16. The lower ear 10 of each pair of ears is positioned in the L-shaped lug 15 to rest on the surface thereof opposed to the under surface of the plate 13, and the peripheral edges of ears 10 abut against the sets of locating stop pins 14 that respectively project from opposite faces of the plate 13. Nuts 16 are turned on the threaded ends 17 of their respective studs 16, for example by using an end wrench, thus firmly securing each piece 11 in the jig. This positions the workpieces 11 for machining under guidance of the tool guides 20 and 22. The sockets 11 are removed by the nuts 18 being retracted, after which another set of sockets 11 can be positioned in the jig in the manner described to locate them for their machining.

The present jig is of considerable aid in speeding up the production of large numbers of bifurcated members of the type shown in Figure 4. In large industrial plants and in Navy yards, large quantities of shackle holes have to be drilled in sockets and the latter must be drilled quickly, accurately, and with little spoilage of materials.

The present jig provides means for rapidly securing, drilling and releasing of the sockets upon which work is to be accomplished. It is adaptable to any reasonable number of sockets, and requires a minimum of tools and skilled operators.

It is to be understood that various modifications and changes can be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

In a jig for holding an elongated workpiece that is bifurcated at its end, the workpiece to be machined continually through the several forks of the bifurcation, a base plate adapted to accommodate the workpiece with the several forks of the bifurcation disposed adjacent to respectively opposite faces of the plate, a tool-guide plate disposed opposite and spaced away from the base plate for a fork of the bifurcation to be positioned between them, a tool guide in the tool-guide plate and a companion tool guide in the base plate in alignment therewith, one or more locating stops positioned to locate the workpiece for its engagement by the tool and including an abutment surface for the workpiece disposed opposite the face of the base plate that is remote from the tool-guide plate, a longitudinal locating device extending away from the stops to position the workpiece in its longitudinal direction with reference to the tool guides, and mechanism operable to actuate the workpiece towards the stops under guidance of the longitudinal locating device and to hold the workpiece in abutting engagement with the stops.

ARTHUR METTRICK.
DAVID HOOK.

REFERENCES CITED

The following references are of record in the file of this patent:

UNITED STATES PATENTS

| Number | Name | Date |
| --- | --- | --- |
| 1,445,016 | Golembiewski | Feb. 13, 1923 |
| 1,452,103 | Yerxa | Apr. 17, 1923 |
| 1,742,224 | Swartz | Jan. 7, 1930 |
| 2,340,508 | Cooke et al. | Feb. 1, 1944 |
| 2,399,257 | Tago | Apr. 30, 1946 |
| 2,409,160 | Sirp | Oct. 8, 1946 |